(12) United States Patent
Suzuki

(10) Patent No.: US 11,931,814 B2
(45) Date of Patent: Mar. 19, 2024

(54) PLATE MATERIAL CUTTING DEVICE

(71) Applicant: SANKYO SEISAKUSHO CO., Tokyo (JP)

(72) Inventor: Kengo Suzuki, Kikugawa (JP)

(73) Assignee: SANKYO SEISAKUSHO CO., Tokyo (JP)

( * ) Notice: Subject to any disclaimer, the term of this patent is extended or adjusted under 35 U.S.C. 154(b) by 0 days.

(21) Appl. No.: 17/788,174

(22) PCT Filed: Dec. 21, 2020

(86) PCT No.: PCT/JP2020/047676
§ 371 (c)(1),
(2) Date: Jun. 22, 2022

(87) PCT Pub. No.: WO2021/132156
PCT Pub. Date: Jul. 1, 2021

(65) Prior Publication Data
US 2023/0023673 A1    Jan. 26, 2023

(30) Foreign Application Priority Data
Dec. 27, 2019 (JP) ................... 2019-237883

(51) Int. Cl.
*B23D 15/04* (2006.01)
*B23D 15/08* (2006.01)
*B23D 35/00* (2006.01)

(52) U.S. Cl.
CPC ............. *B23D 15/04* (2013.01); *B23D 15/08* (2013.01); *B23D 35/001* (2013.01)

(58) Field of Classification Search
CPC ...... B23D 15/04; B23D 15/08; B23D 35/001; B23D 15/12; B23D 25/02; B23D 25/08;
(Continued)

(56) References Cited

U.S. PATENT DOCUMENTS 3,245,293 A * 4/1966 Kirchner ................ B26D 3/281
83/176
3,279,291 A * 10/1966 Brombach ............. B23D 25/02
83/304

(Continued)

FOREIGN PATENT DOCUMENTS

CN         101468406 A      7/2009
CN         110508866 B  * 10/2020 .......... B23D 35/005
(Continued)

OTHER PUBLICATIONS

International Search Report of the International Search Authority issued in PCT/JP2020/047676, dated Feb. 2, 2021; ISA/JP.
(Continued)

*Primary Examiner* — Ghassem Alie
(74) *Attorney, Agent, or Firm* — Harness, Dickey & Pierce, P.L.C.

(57) ABSTRACT

To provide a plate material cutting device of which thickness can be reduced and made compact. A plate material cutting device includes: a first cutting blade fixed to a housing; a second cutting blade that cuts plate material collaboratively with the first cutting blade; and a drive unit that causes the second cutting blade to reciprocally move with respect to the first cutting blade, wherein the drive unit includes: a shaft that is rotatable on a rotational axis; a first motor connected to one end portion of the shaft; a first mechanism that is capable of causing the second cutting blade to reciprocally move with respect to the first cutting blade in conjunction with rotation of the shaft on the rotational axis; and a second mechanism that is capable of supporting a load onto the shaft at a time of cutting plate material.

9 Claims, 6 Drawing Sheets

(58) Field of Classification Search
CPC ..... B23D 25/06; B23D 36/0041; F01L 1/047; Y10T 83/8874; Y10T 83/8873; Y10T 83/4751; Y10T 83/4754; Y10T 83/881
USPC ......... 83/425, 315, 316, 318, 320, 327, 328, 83/627, 628, 632, 635, 638, 644, 646, 83/647, 5, 824
See application file for complete search history.

(56) References Cited

U.S. PATENT DOCUMENTS

| | | | | |
|---|---|---|---|---|
| 3,487,738 | A | * | 1/1970 | Bearer .................. B23D 25/06 83/316 |
| 3,811,354 | A | * | 5/1974 | Ito ..................... B23D 36/0058 83/320 |
| 3,855,888 | A | | 12/1974 | Gay |
| 3,872,753 | A | * | 3/1975 | Takubo ................. B23D 25/06 83/824 |
| 4,054,076 | A | * | 10/1977 | Kumabe ................ B23D 15/08 83/646 |
| 4,103,576 | A | * | 8/1978 | Benz ..................... B23D 25/06 83/628 |
| 2010/0129023 | A1 | | 5/2010 | Lemaitre et al. |
| 2013/0055982 | A1 | | 3/2013 | Flender et al. |

FOREIGN PATENT DOCUMENTS

| | | | | |
|---|---|---|---|---|
| GB | 899304 | A | * 6/1962 | ............. B23D 15/12 |
| JP | S46-018049 | Y1 | 6/1971 | |
| JP | S49-104787 | U1 | 9/1974 | |
| JP | S57-173920 | U1 | 11/1982 | |
| JP | S62-110808 | U1 | 7/1987 | |
| JP | S01-071018 | U1 | 5/1989 | |
| JP | 3015779 | U | 9/1995 | |
| JP | H9-131613 | A | 5/1997 | |
| JP | H10-18812 | A | 1/1998 | |
| JP | 2010-540839 | A | 12/2010 | |
| JP | 2011-223807 | A | 11/2011 | |
| JP | 2012231028 | A | 11/2012 | |
| JP | 2013-44431 | A | 3/2013 | |
| JP | 2013-96328 | A | 5/2013 | |
| JP | 3186989 | U | 10/2013 | |
| JP | 2013-248703 | A | 12/2013 | |
| JP | 2014104500 | A | 6/2014 | |

OTHER PUBLICATIONS

Office Action dated Apr. 13, 2023 in corresponding Chinese Application No. 202080086184.1 with machine translation.
Extended European Search Report (EESR) dated Dec. 5, 2023 in corresponding European Patent Application No. 20905985.6.

* cited by examiner

PLATE MATERIAL CUTTING DEVICE

CROSS-REFERENCE TO RELATED APPLICATIONS

This application is a 371 U.S. National Phase of International Application No. PCT/JP2020/047676 filed on Dec. 21, 2020, which claims the benefit of priority from Japanese Patent Application No. 2019-237883 filed on Dec. 27, 2019. The entire disclosure of all of the above applications is incorporated herein by reference.

TECHNICAL FIELD

The present invention relates to a plate material cutting device capable of being made thin and compact.

BACKGROUND ART

Patent Document 1 discloses a punching press machine including an uncoiler holding and rotating a strip-shaped steel plate in a rolled condition, a press device having a pair of punching dies punching a steel plate part having a predetermined shape from the strip-shaped steel plate, a feeding device sequentially feeding the strip-shaped steel plate drawn from the uncoiler between the pair of punching dies at a predetermined feed pitch, and a stack forming device arranged on an upstream side of a feed direction with respect to the press device and causing slack in the strip-shaped steel plate when the feed by the feeding device is stopped, wherein a scrap cutter cutting and collecting a scrap remaining after punching a core steel plate part from the strip-shaped steel plate is arranged on a downstream side of the feed direction with respect to the press device.

Patent Document 2 discloses a cutting device including a cutting blade of which an upper blade is installed diagonally, and of which a lower blade is installed and fixed horizontally, and a mechanism for converting a rotational motion into a linear motion to drive the upper blade up and down from both sides with one motor. The cutting device is configured from a pair of pulleys coupled by a shaft to which a rotational drive of a servo motor fixed to a fixed plate is transmitted via a belt, a pair of eccentric cams that rotate in conjunction with rotation of the shaft, a pair of coupling rods that drive simultaneously in the vertical direction as the pair of eccentric cams rotate, a pair of coupling rings connected to the pair of coupling rods, a movable base, that can move up and down, including protruding shafts protruding from centers of left and right ends, that engages with the pair of coupling rings, and the upper blade that is fixed to the movable base via an upper blade fixing plate. By such a configuration, as the pair of coupling rods move up and down, the movable base moves up and down, and the upper blade fixing plate and the upper blade are driven up and down.

CITATION LIST

Patent Literature

PATENT DOCUMENT 1: JP-A-2014-104500
PATENT DOCUMENT 2: JP-A-2012-231028

SUMMARY OF INVENTION

Technical Problem

The cutting device of Patent Document 2 has a problem that it cannot be made thin and compact since the rotational drive of the servo motor is transmitted to the pair of pulleys coupled by the shaft via the belt, has a problem that it is structurally complicated and tends to be costly as configured from the pair of eccentric cams that rotate in conjunction with rotation of the shaft, the pair of coupling rods that drive simultaneously in the vertical direction as the pair of eccentric cams rotate, the pair of coupling rings connected to the pair of coupling rods, the movable base, that can move up and down, including the protruding shafts protruding from the centers of the left and right ends, that engages with the pair of coupling rings, and the upper blade that is fixed to the movable base via the upper blade fixing plate, and has a problem that it cannot realize stable cutting of the sheet material since the reaction of the load on the sheet material causes the upper blade, the upper blade fixing plate, and the movable base to return to the upper side, and causes the runout of the sheet material and/or the upper blade when the upper blade descends from the upper side to apply a load to the sheet material in order to cut the sheet material in cooperation with the lower blade.

Therefore, an object of the present invention is to provide a plate material cutting device capable of solving the above problems and being made thin and compact.

Solution to Problem

According to an aspect of the present invention, a plate material cutting device for cutting a conveyed plate material includes a first cutting blade fixed to a housing, a second cutting blade cutting the plate material in cooperation with the first cutting blade, and a drive unit for reciprocating the second cutting blade with respect to the first cutting blade, wherein the drive unit includes a shaft rotatable around a rotational axis, a first motor connected to one end of the shaft, a first mechanism capable of reciprocating the second cutting blade with respect to the first cutting blade in conjunction with rotation around the rotational axis of the shaft, and a second mechanism capable of supporting a load on the shaft at a time of cutting the plate material.

According to a specific example of the present invention, in the plate material cutting device, the first mechanism includes at least one cam fixed to the shaft, the at least one cam is capable of reciprocating the second cutting blade with respect to the first cutting blade in conjunction with rotation around the rotational axis of the shaft, and the second mechanism includes at least one bearing capable of supporting the load on the shaft at the time of cutting the plate material.

According to a specific example of the present invention, in the plate material cutting device, the at least one cam is a plurality of cams, the at least one bearing is a plurality of bearings, and the plurality of cams and the plurality of bearings are alternately arranged along the shaft.

According to a specific example of the present invention, in the plate material cutting device, the at least one bearing includes a roller, and the roller of the at least one bearing is capable of rolling in contact with the shaft and is capable of supporting the load on the shaft at the time of cutting the plate material.

According to a specific example of the present invention, in the plate material cutting device, the drive unit further includes at least one driven unit for converting the rotational motion of the at least one cam into the reciprocating motion of the second cutting blade.

According to a specific example of the present invention, in the plate material cutting device, the at least one driven unit includes a roller, and the roller of the at least one driven unit is capable of rolling in contact with a corresponding cam.

According to a specific example of the present invention, in the plate material cutting device, the at least one driven unit includes an elastic member, and the elastic member causes the at least one driven unit to smoothly convert the rotational motion of the at least one cam into the reciprocating motion of the second cutting blade.

According to a specific example of the present invention, in the plate material cutting device, the second cutting blade reciprocates according to a signal from an outside of the plate material cutting device.

According to a specific example of the present invention, in the plate material cutting device, the drive unit further includes a second motor connected to the other end of the shaft.

According to a specific example of the present invention, in the plate material cutting device, the second cutting blade has a shape of which a height is the highest in a central portion and lowers from the central portion toward an end portion.

Advantageous Effect of Invention

According to the present invention, it is possible to suppress the runout of the plate material and/or the cutting blade at the time of cutting the plate material to realize stable cutting of the plate material.

Other objects, features and advantages of the present invention will become apparent from the following description of the embodiments of the present invention taken in conjunction with the accompanying drawings.

DESCRIPTION OF EMBODIMENTS

Figure 1:
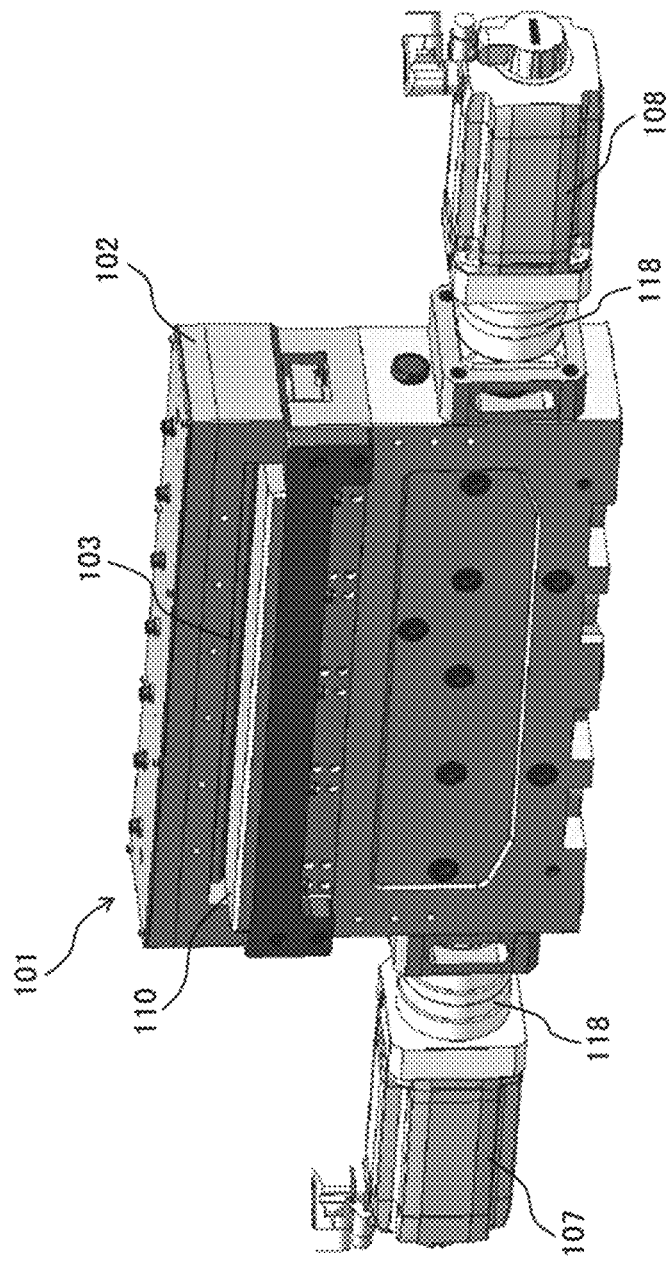
FIG. 1 is a perspective view of a plate material cutting device as an embodiment of the present invention.

Embodiments according to the present invention will be described with reference to the drawings. However, the present invention is not limited to those embodiments.

With reference to FIGS. 1 to 5, a plate material cutting device 101 for cutting a conveyed plate material as an embodiment of the present invention will be described. The plate material cutting device 101 includes a housing 102, a first cutting blade 103 fixed to the housing 102, a second cutting blade 104 cutting the plate material in cooperation with the first cutting blade 103, and a drive unit for reciprocating the second cutting blade 104 with respect to the first cutting blade 103. The drive unit includes a shaft 105 rotatable around a rotational axis 106, a first motor 107 connected to one end of the shaft 105, a first mechanism capable of reciprocating the second cutting blade 104 with respect to the first cutting blade 103 in conjunction with rotation around the rotational axis 106 of the shaft 105, and a second mechanism capable of supporting a load on the shaft 105 at a time of cutting the plate material. By such a configuration of the plate material cutting device 101, it is possible to downsize the first motor 107 to make the plate material cutting device 101 thin and compact. Moreover, when the second cutting blade 104 applies the load to the plate material in order to cut the plate material in cooperation with the first cutting blade 103, by supporting the load on the shaft 105 due to the reaction of the load on the plate material, it is possible to suppress the runout of the plate material and/or the second cutting blade 104, and it is possible to realize stable cutting of the plate material.

The first mechanism may include at least one cam 109 fixed to the shaft 105. As the shaft 105 rotates about the rotational axis 106, the at least one cam 109 can rotate in conjunction with it to reciprocate the second cutting blade 104 with respect to the first cutting blade 103. Then, as the second cutting blade 104 approaches the first cutting blade 103 and the first cutting blade 103 and the second cutting blade 104 mesh with each other, the plate material that has been conveyed from an outside through an inlet 110 arranged in the housing 102 is cut. The at least one cam 109 may be a plate cam having a special contour curve, a plane cam having a special groove, or the like, and may be, for example, a disk cam having an eccentric disk, a triangular cam, or the like. The at least one cam 109 may have a shape capable of realizing the reciprocating motion of the second cutting blade 104 required by the rotation of the shaft 105 around the rotational axis 106.

The second mechanism may include at least one bearing 111 capable of supporting the load on the shaft 105 at the time of cutting of the plate material. When the second cutting blade 104 approaches the first cutting blade 103 by the rotation of the at least one cam 109 and applies the load to the plate material in order to cut the plate material in cooperation with the first cutting blade 103, since the shaft 105 is most susceptible to the load due to the reaction of the load on the plate material in the vicinity of the cam 109, the bearing 111 may be arranged in the vicinity of the cam 109.

Figure 2:
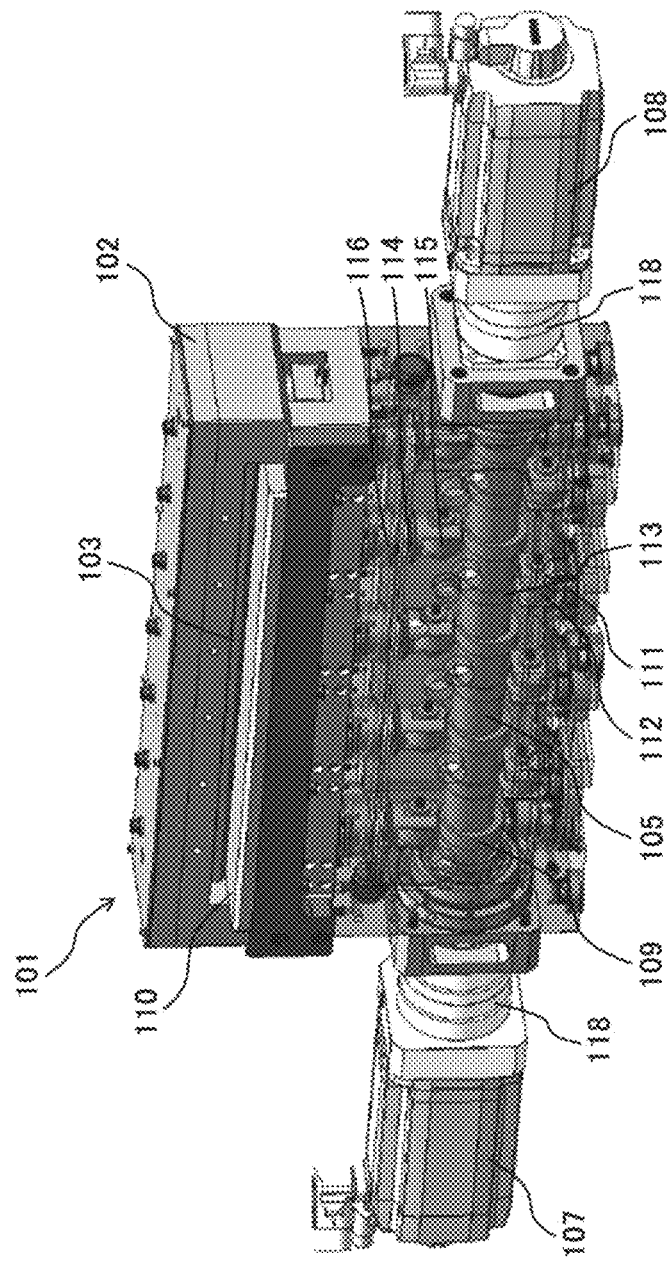
FIG. 2 is a perspective view of the plate material cutting apparatus of FIG. 1 of which a part is transparently shown.
Figure 3:
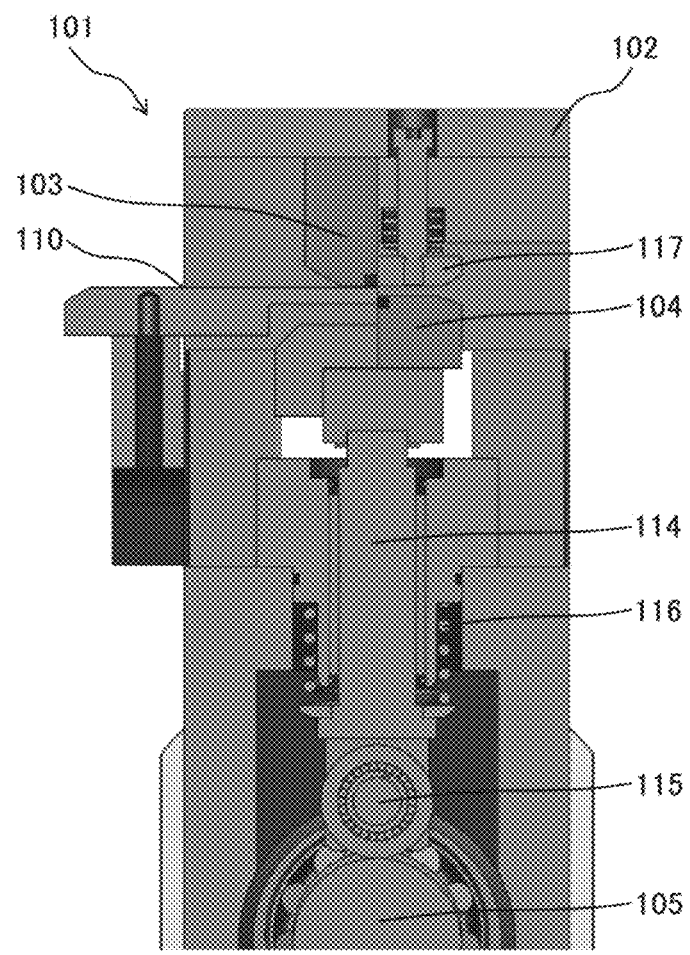
FIG. 3 is a partial cross-sectional view viewed from the side surface of the plate material cutting apparatus of FIG. 1.
Figure 4:
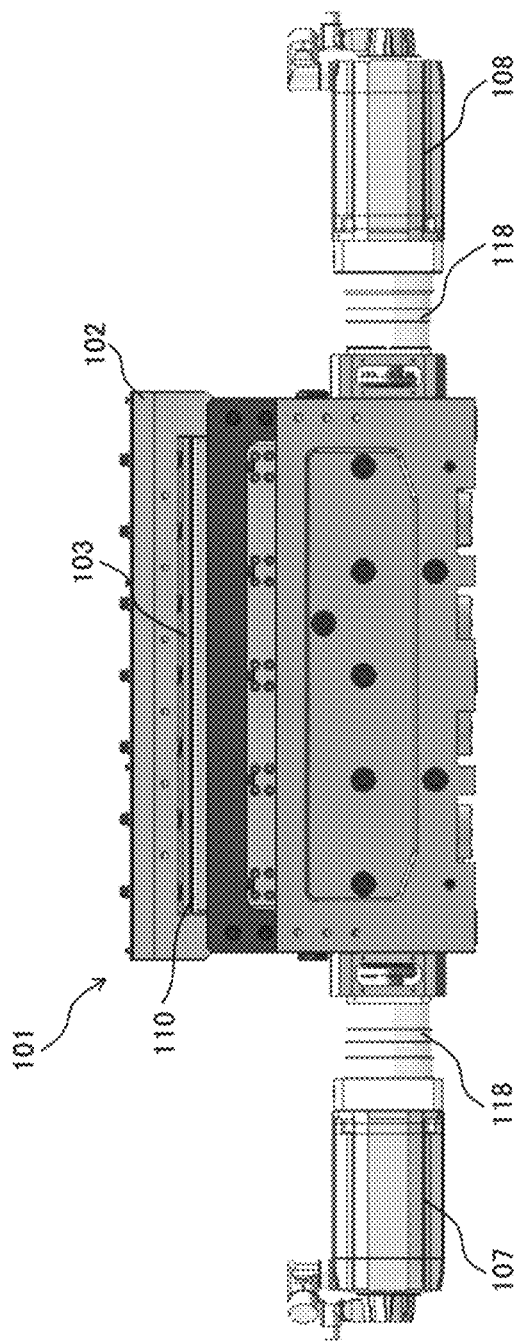
FIG. 4 is a front view of the plate material cutting device of FIG. 1.
Figure 5:
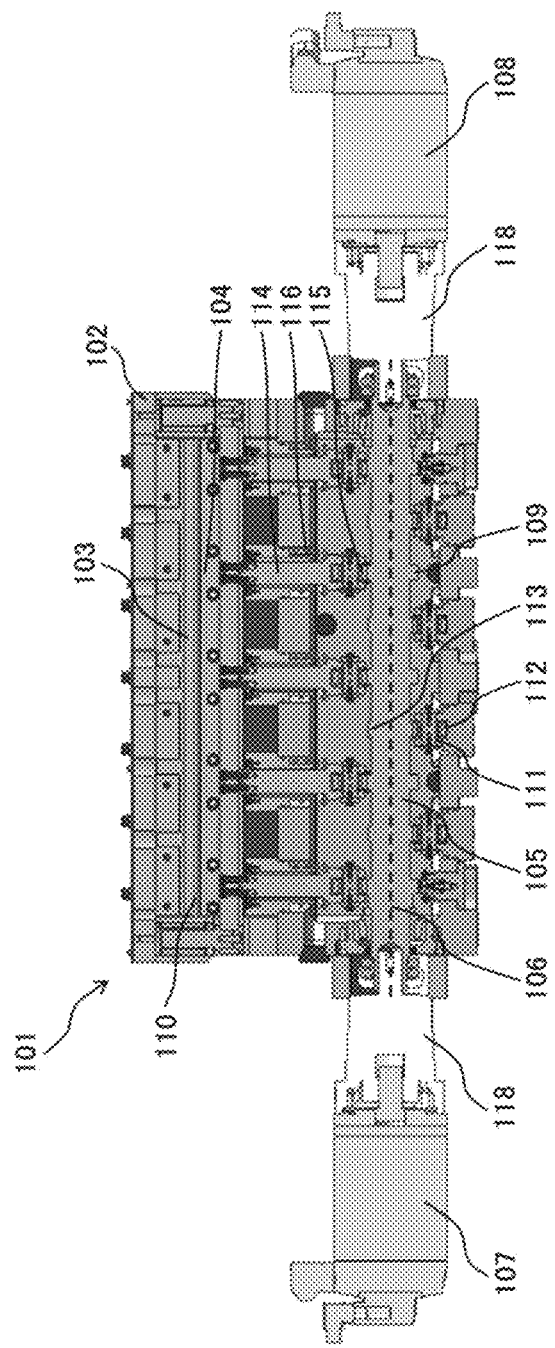
FIG. 5 is a cross-sectional view viewed from the front of the plate material cutting device of FIG. 1.
Figure 6:
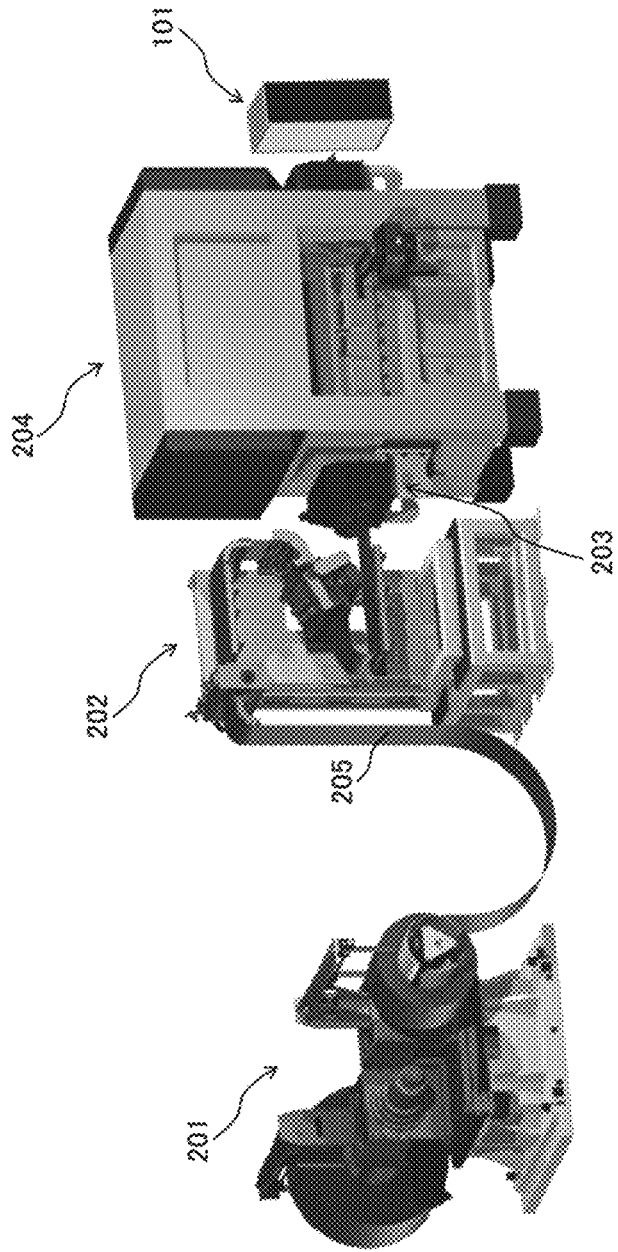
FIG. 6 is a perspective view of a press working line in which the plate material cutting device is used as an embodiment of the present invention.

The at least one cam 109 may be a plurality of cams 109. The plurality of cams 109 may be arranged at uniform intervals on the shaft 105 along the rotational axis 106, as shown in FIG. 2, such that the second cutting blade 104 can apply the load as uniformly as possible to a cutting portion of the plate material. Moreover, the at least one bearing 111 may be a plurality of bearings 111. When the second cutting blade 104 applies the load to the plate material in order to cut the plate material in cooperation with the first cutting blade 103, the plurality of bearings 111 may be arranged at uniform intervals on the shaft 105 along the rotational axis 106, as shown in FIG. 2, such that the load due to the reaction of the load on the plate material is applied to the shaft 105 along the rotational axis 106 as uniformly as possible. Moreover, each bearing 111 may be arranged in the vicinity of any of the plurality of cams 109. Moreover, the plurality of cams 109 and the plurality of bearings 111 may be alternately arranged on the shaft 105 along the rotational axis 106.

The at least one bearing 111 may include a roller 112. The at least one bearing 111 can smoothly come into contact with the shaft 105 via the roller 112, whereby it is possible to suppress the wear of the shaft 105. The roller 112 can come into contact with the shaft 105 and roll along the outer circumferential direction of the shaft 105 in conjunction with rotation around the rotational axis 106 of the shaft 105. Moreover, when the second cutting blade 104 applies the load to the plate material in order to cut the plate material in cooperation with the first cutting blade 103, the roller 112 can support the load on the shaft 105 due to the reaction of the load on the plate material. The shaft 105 may include an outer edge portion 113 for coming into contact with the roller 112 along the outer circumferential direction of the shaft 105. The outer edge portion 113 allows the shaft 105 to further suppress the wear due to contact with the rollers 112.

The drive unit may further include at least one driven unit 114 for converting the rotational motion of the at least one cam 109 into the reciprocating motion of the second cutting blade 104. For example, when the at least one cam 109 is an eccentric cam as shown in FIG. 2, in the condition where the most distal portion of the eccentric cam from the center of the shaft 105 (the point through which the rotational axis 106 passes) is at the lowermost position, the second cutting blade 104 is located at the lowermost position, and as the shaft 105 rotates and the most distal portion approaches the uppermost position, the driven unit 114 causes the rotational motion of the at least one cam 109 to be converted into the reciprocating motion of the second cutting blade 104 such that the second cutting blade 104 is gradually raised. Then, as the shaft 105 rotates to a certain angle, the first cutting blade 103 and the second cutting blade 104 start meshing so as to apply the load to the plate material such that the cutting of the plate material is started, and by the time the shaft 105 further rotates such that the most distal portion reaches the highest position and the second cutting blade 104 reaches the highest position, the cutting of the plate material is completed. As the first cutting blade 103 and the second cutting blade 104 start meshing so as to apply the load to the plate material, the load is applied to the shaft 105 via the driven unit 114 due to the reaction of the load on the plate material. However, the at least one bearing 111 can support the load on the shaft 105 due to the reaction of the load on the plate material. As a result, it is possible to suppress the runout of the plate material and/or the second cutting blade 104, and it is possible to realize stable cutting of the plate material. When the at least one cam 109 is a plurality of cams 109, the rotational motion of each cam 109 may be converted into the reciprocating motion of the second cutting blade 104 by a corresponding driven unit 114, as shown in FIG. 2. In addition, the rotation of the at least one cam 109 may not start from the condition where the most distal portion is at the lowest position, and may start from a predetermined angle where the most distal portion is between the lowest position and the highest position, and the at least one cam 109 may rotate so as to reciprocate between two predetermined angles. Moreover, by controlling a rotational speed of a rotor of the first motor 107, a rotational speed of the at least one cam 109 may be controlled and a speed of the reciprocating motion of the second cutting blade 104 may be controlled to control a speed at the time of cutting the plate material. As a result, it is possible to realize stable cutting of the plate material according to a condition of the plate material such as the thickness, hardness, and width of the plate material. Even when a plate cam having a special contour curve such as a triangular cam other than the above eccentric cam, a plane cam having a special groove, or the like is adopted as at least one cam 109, it can be controlled according to its adopted cam similarly to the above eccentric cam.

The at least one driven unit 114 may include a roller 115. The at least one driven unit 114 can smoothly come into contact with the cam 109 via the roller 115, whereby it is possible to suppress the wear of the cam 109. The roller 115 can come into contact with the at least one cam 109 and roll along the outer circumferential direction of the cam 109 in conjunction with the rotational motion of the cam 109.

The at least one driven unit 114 may include an elastic member 116. The second cutting blade 104 may occur jumping due to an influence from an outside, an influence at the time of cutting the plate material, or the like, and it may not be possible to realize stable cutting of the plate material. The elastic member 116 absorbs the jumping of the second cutting blade 104 due to the influence from the outside, the influence at the time of cutting the plate material, or the like, such that the at least one driven unit 114 can cause the rotational motion of the at least one cam 109 to be smoothly converted into the reciprocating motion of the second cutting blade 104. The elastic member 116 may be a coil spring provided so as to wind around the at least one driven unit 114. Moreover, the plate material cutting device 101 may include a stripper 117 for sandwiching the plate material, which has been conveyed, in cooperation with the second cutting blade 104 so as to avoid the runout of the plate material and separating the cut plate material from the first cutting blade 103 and the second cutting blade 104 after cutting the plate material by the first cutting blade 103 and the second cutting blade 104.

The plate material cutting device 101 can be used in a press working line. In the press working line, a plate material 205 such as a coil material is conveyed from an uncoiler 201 to a plate material supplying device 202 by a plate material conveying device 203, and is intermittently conveyed to a working device 204 such as a press device through the plate material conveying device 203. The working device 204 such as the press device can perform working process such as press working on the plate material 205 intermittently conveyed from the plate material conveying device 203 to manufacture structures such as small parts used for information-related apparatuses such as mobile phones and personal computers, and components such as automobiles, industrial motor parts, and home appliances. Then, the worked plate material 205 is conveyed to the plate material cutting device 101. In this case, the first cutting blade 103 and the second cutting blade 104 of the plate material cutting device 101 constitute a so-called scrap cutter. The second cutting blade 104 may reciprocate according to a signal from an outside of the plate material cutting device 101. For example, the second cutting blade 104 may reciprocate in synchronization with the working process of the working device 204. The second cutting blade 104 reciprocates according to the rotation of the rotor of the first motor 107. The working device 204 such as the press device can transmit a signal to the plate material conveying device 203 so as to intermittently convey the plate material 205 according to the working process such as press working, and transmit the signal to the plate material cutting device 101, thereby rotating the rotor of the first motor 107 in synchronization with the working process such as press working, and further reciprocating the second cutting blade 104 in synchronization with the working process such as press working. Moreover, by downsizing the first motor 107 to make the plate material cutting device 101 thin and compact, it is possible to arrange the plate material cutting device 101 close to the working device 204 such as the press device, and it is possible to make the press working line compact.

As shown in FIGS. 1 to 5, the drive unit includes the first motor 107 connected to one end of the shaft 105 and a second motor 108 connected to the other end of the shaft 105. However, the drive unit may include only the first motor 107 connected to only one end of the shaft 105. The number of motors connected to the shaft 105 may be selected as necessary. For example, when the load applied to the plate material in order to cut a thick and/or hard plate material is large, when the load applied to the plate material in order to cut a wide plate material is widespread, or the like, the drive unit may include the first motor 107 connected to one end of the shaft 105, and a second motor 108 connected to the other end of the shaft 105 in order to prevent the shaft 105 from twisting, as shown in FIGS. 1 to 5. Moreover, speed reducers 118 may be provided between the first motor 107 and the shaft 105 and between the second motor 108 and the shaft 105, respectively.

The second cutting blade 104 may have a chevron shape such that a height thereof is the highest in a central portion of the second cutting blade 104 and lowers from the central portion toward an end portion of the second cutting blade 104. Therefore, the first cutting blade 103 and the central portion of the second cutting blade 104 start meshing so as to apply the load to the central portion of the cutting portion of the plate material such that the cutting of the plate material is started, and as the second cutting blade 104 is raised, the second cutting blade 104 meshes with the first cutting blade 103 from the central portion toward the end portion of the second cutting blade 104 so as to apply the load from the central portion toward the end portion of the cutting portion of the plate material to cut the plate material. By such a second cutting blade 104, it is possible to suppress the runout of the plate material and/or the second cutting blade 104, and it is possible to realize stable cutting of the plate material. Moreover, the second cutting blade 104 may have a shape in which the central portion of the second cutting blade 104 is flat and of which a height lowers from the flat central portion toward the end portion. The difference in height between the central portion and the end portion of the second cutting blade 104 may be equal to or less than the thickness of the plate material, or may be substantially the same as the thickness of the plate material.

It should be further understood by persons skilled in the art that although the foregoing description has been made on embodiments of the present invention, the present invention is not limited thereto and various changes and modifications may be made without departing from the principle of the present invention and the scope of the appended claims.

The invention claimed is:

1. A plate material cutting device for cutting a conveyed plate material, the plate material cutting device comprising:
    a first cutting blade fixed to a housing;
    a second cutting blade cutting the conveyed plate material in cooperation with the first cutting blade; and
    a drive unit reciprocating the second cutting blade with respect to the first cutting blade; wherein
    the drive unit includes a shaft rotatable around a rotational axis, a first motor connected to one end of the shaft, a plurality of cams having a first cam arranged near one end of the shaft, a second cam arranged near the other end opposite to the one end of the shaft, and at least one cam arranged between the first cam and the second cam, the plurality of cams arranged at uniform intervals on the shaft along the rotational axis, the plurality of cams reciprocating the second cutting blade with respect to the first cutting blade in conjunction with rotation around the rotational axis of the shaft and causing the second cutting blade to uniformly apply a first load on the plate material, and a plurality of bearings having a first bearing arranged near one end of the shaft, a second bearing arranged near the other end opposite to the one end of the shaft, and at least one bearing arranged between the first bearing and the second bearing, the plurality of bearings arranged at uniform intervals on the shaft along the rotational axis, the plurality of bearings supporting the shaft to uniformly apply a second load due to the reaction of the first load on the shaft along the rotational axis.

2. The plate material cutting device according to claim 1, wherein the plurality of cams and the plurality of bearings are alternately arranged along the shaft.

3. The plate material cutting device according to claim 1, wherein each bearing comprises a roller rolling in contact with the shaft to support the shaft.

4. The plate material cutting device according to claim 1, wherein the drive unit further comprises a plurality of driven units converting the rotational motion of the plurality of cams into the reciprocating motion of the second cutting blade.

5. The plate material cutting device according to claim 4, wherein each driven unit comprises a roller rolling in contact with one cam of the plurality of cams.

6. The plate material cutting device according to claim 4, wherein each driven unit comprises an elastic member causing each driven unit to smoothly convert the rotational motion of each cam into the reciprocating motion of the second cutting blade.

7. The plate material cutting device according to claim 1, wherein the second cutting blade reciprocates according to a signal from an outside of the plate material cutting device.

8. The plate material cutting device according to claim 1, wherein the drive unit further comprises a second motor connected to the other end of the shaft opposite to the one end of the shaft.

9. The plate material cutting device according to claim 1, wherein the second cutting blade has a shape of which a height is the highest in a central portion and lowers from the central portion toward an end portion.

\* \* \* \* \*